United States Patent

[11] 3,576,486

[72] Inventors Wilmer Graziano
Via Bertarino, 8, Tortona;
Guido Ruggeri, Via Broggi, 7, Milan, Italy
[21] Appl. No. 615,951
[22] Filed Feb. 14, 1967
[45] Patented Apr. 27, 1971
[32] Priority Feb. 15, 1966
[33] Italy
[31] 14528

[54] SERVOSYSTEM WITH VARYING ANGULAR RELATIONSHIPS BETWEEN A PRIMARY CONTROL AXIS AND ONE OR MORE SECONDARY CONTROLLED AXES
1 Claim, 2 Drawing Figs.
[52] U.S. Cl.................................................. 318/573,
318/654, 318/660
[51] Int. Cl........................................... G05b 19/24
[50] Field of Search............................318/20.270,
20.730, 20.735, 20.130

[56] References Cited
UNITED STATES PATENTS

| | | | |
|---|---|---|---|
| 3,328,655 | 6/1967 | Tripp............................ | 318/20.130X |
| 3,141,121 | 7/1964 | Moody et al................ | 318/(20.270UX) |
| 3,178,663 | 4/1965 | Kahn........................... | 318/(20.270UX) |
| 3,217,318 | 11/1965 | Masel........................... | 318/(20.270UX) |
| 3,353,095 | 11/1967 | Farrand....................... | 318/(20.735UX) |
| 3,373,326 | 3/1968 | Farrand....................... | 318/(20.270UX) |
| 3,396,321 | 8/1968 | Pellecchia.................... | 318/(20.730UX) |

Primary Examiner—T. E. Lynch
Attorney—Littlepage, Quaintance, Wray and Aisenberg ABSTRACT: A reference transducer is connected to a control shaft via a transmission. Turning the control shaft through one angle turns the reference transducer through a second unique angle. Conventional servosystem apparatus interconnects the reference transducer with the responsive transducers which are directly connected to response shafts. Consequently, the response shafts are turned through the second angle, and not through the same first angle as the control shaft.

Patented April 27, 1971  3,576,486

INVENTORS
Wilmer Graziano + Guido Ruggeri
BY Littlepage & Quaintance
ATTORNEYS

SERVOSYSTEM WITH VARYING ANGULAR RELATIONSHIPS BETWEEN A PRIMARY CONTROL AXIS AND ONE OR MORE SECONDARY CONTROLLED AXES This invention relates to a servosystem comprising a plurality of electromagnetic angular position transducers for achieving varying ratios between a primary axis and one or more secondary axes.

The device according to the invention is particularly adapted for use on machine tools.

More particularly, the above servosystem is characterized by comprising a plurality of electromagnetic angular position transducers, one of which is connected during rotation to the primary axis and operates as a reference transducer, while the other or others are respectively rigidly connected to one or more secondary axes and operate as transducers detecting the movements thereof, as well as one or more continuous or discontinuous speed variators, inserted between one or more individual axes and respective transducers, said servosystem being particularly adapted for use on machine tools.

The accompanying drawing shows by way of nonrestrictive example a diagram for the servosystem according to the present invention, and particularly:

Figure 1:
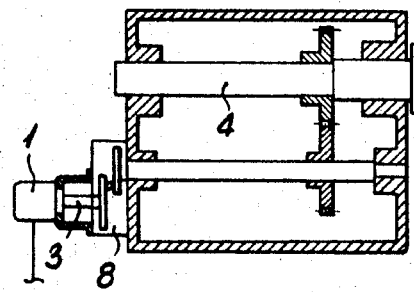
FIG. 1 is partly a sectional and party a general view of the control members for a machine tool, on which one of the electromagnetic transducers forming part of the device is inserted and connected to the primary axis by a speed variator.

Referring to the figures, it can be seen that the servosystem according to the present invention comprises a plurality of electromagnetic angular position transducers of the synchro- or resolver-type. One of these, designated at 1 of FIG. 1, rotates integrally with an axis 3, the motion of which is controlled by means of a continuous or discontinuous angular speed variator 8 schematically shown in FIG. 1 on the axis 4 of the machine on which the device is applied.

Figure 2:
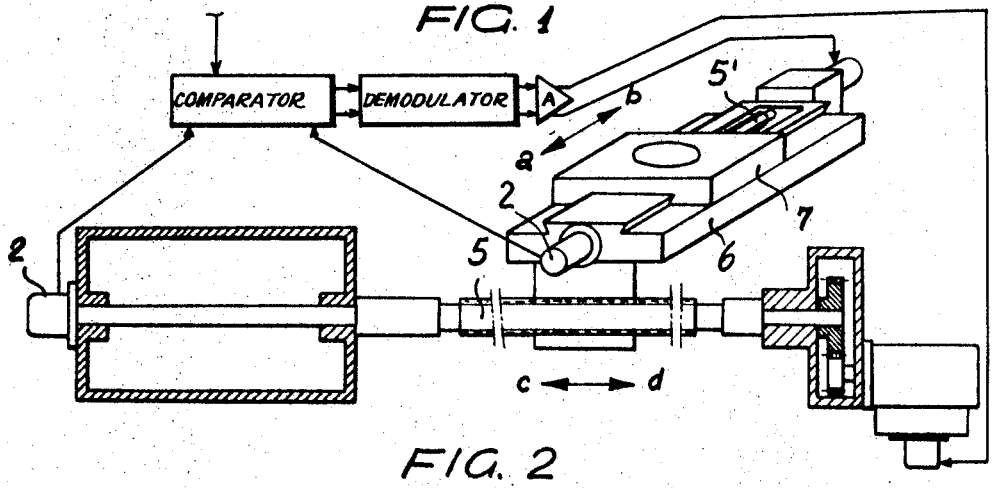
FIG. 2 is partly a sectional and partly a perspective view of a portion of a machine tool on which two electromagnetic transducers forming part of the device are mounted.

The other electromagnetic transducers, designated at 2 in FIG. 2, are each integral with a secondary axis of the machine, the rotation of which linearly depends on the rotary or translatory motions to be adjusted; in the figure such axes are formed of the screws 5 and 5'.

The rotation of screw 5 in either direction causes the displacement of carriage 6 in the direction of one of the arrows c, d. The rotation of screw 5' in either direction causes the displacement of slide 7 in the direction of one of the arrows a, b. The two above displacements according to arrows a, b and c, d can be simultaneous or subsequent to one another.

Transducer 1 operates as a reference, while the other transducers designated at 2 operates as detecting transducers for the movements to be adjusted.

The output signals of the first transducer are compared with those of each of the other transducers and these signals, suitably demodulated and amplified, are respectively used for controlling the individual operations.

Therefore, axis rotations are provided according to predetermined ratios with the rotation of a single control axis, and thus the desired feeding for each revolution of the latter.

In the above exemplary described embodiment, a speed variator is interposed between the primary axis and the reference transducer, whilst the other transducers are rigidly connected to the secondary axes or shafts.

However, it is to be understood that the present invention contemplates other embodiments, in which a continuous or discontinuous speed variator is inserted between the transducer and the relative secondary axis.

We claim:

1. A servosystem for varying relative angular displacement of a primary control shaft and at least one secondary controlled shaft in machine tools comprising:

a base mounted on a machine,
   a primary control shaft having first and second ends mounted for rotation in the base,
   a control dial having outward facing indicia connected to one end of the primary shaft for rotation therewith,
   a variable speed variator having an input and output selectively interconnected by means for varying the relationship between the input and output, the input of the speed variator being connected to the second end of the primary shaft opposite the dial,
   a primary magnetic angular position transducer having a rotor connected to the output of the speed variator,
   a secondary shaft rotatably mounted on the base,
   a motor having a rotor connected to the secondary shaft for turning the secondary shaft,
   a secondary electromagnetic angular position transducer having a rotor connected to the secondary shaft for turning therewith,
   a comparator connected to the primary and secondary transducers for producing an error signal, and
   a motor control including an amplifier connected to the comparator and to the motor for turning the secondary shaft until no error signal is produced.